UNITED STATES PATENT OFFICE.

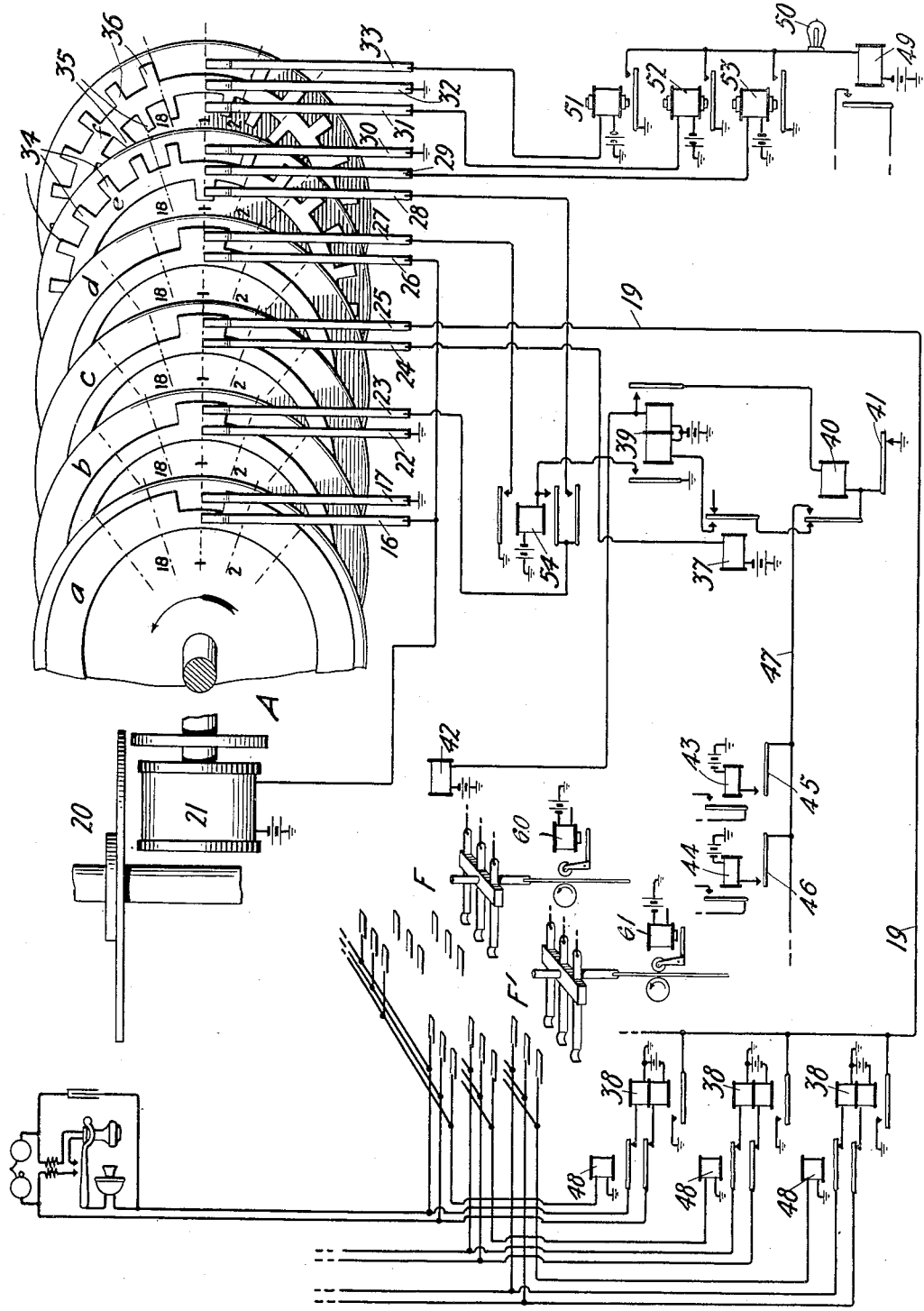

RALPH L. QUASS, OF HAWTHORNE, NEW JERSEY, ASSIGNOR TO WESTERN ELECTRIC COMPANY, INCORPORATED, OF NEW YORK, N. Y., A CORPORATION OF NEW YORK.

SWITCH-CONTROL SYSTEM.

1,293,195.     Specification of Letters Patent.     Patented Feb. 4, 1919.

Application filed July 5, 1916. Serial No. 107,542.

*To all whom it may concern:*

Be it known that I, RALPH L. QUASS, a citizen of the United States, residing at Hawthorne, in the county of Passaic and State of New Jersey, have invented certain new and useful Improvements in Switch-Control Systems, of which the following is a full, clear, concise, and exact description.

This invention relates to a switch control system intended primarily for use in connection with telephone systems, and its object is to provide means for actuating a signal or other device in case apparatus upon which the operation of the system depends fails to function properly. The invention is intended particularly to provide an organization whereby a circuit controlling device, such as a sequence switch, automatically signals its failure to operate properly.

The invention in one of the forms in which it may be practised and in one of the uses to which it may be applied is illustrated in the accompanying drawing. The sequence switch that is employed in this embodiment of the invention is of the type disclosed in Patent 1,127,808 to Reynolds and Baldwin, issued Feb. 9, 1915; and in this particular instance, the sequence switch is illustrated as controlling circuits of a type that are employed in automatic call-distributing systems for governing the movement and operation of line finder switches. In this use, the sequence switch, to function properly, must move promptly out of its normal or resting position when the circuit is closed to cause such movement, and must rotate approximately at a predetermined rate of speed in order to establish a timing interval for controlling the operation of the associated apparatus. In the present form of the invention, the means responsive to improper operation comprises several slow acting relays, the energizing circuits of these relays being connected with segments on the sequence switch, so arranged that the circuits of the slow acting relays are consecutively and intermittently closed as the switch moves, but for too brief an interval, when the switch moves at its proper rate of speed, to permit any of the relays to close its contacts. If the rate of rotation is unduly retarded, one or another or all of the relays close their contacts and effect the operation of an alarm signal. The switch segments to which the slow acting relays are connected are so disposed that in the movement of the switch one or another of the relays always has its circuit closed, so that wherever the sequence switch may improperly be brought to rest one or another of the slow acting relay circuits is closed at that point to cause the operation of the alarm signal.

In the drawing, the circuit-controlling disks $a$, $b$, $c$, $d$, $e$, and $f$, and the driving mechanism 20 of the sequence switch A are shown diagrammatically. The sequence switch may be assumed to be an eighteen position switch—that is, a switch so constructed that it may be operated to bring its associated disks to rest at any one of eighteen points to which the disks may be progressively rotated in the movement of the switch. The 360 degree movement of the switch is therefore divided into eighteen divisions of 20 degrees each. In the drawing, only enough of each of the conducting disks is shown to illustrate the characteristic formation of the conducting portion of each disk; and these portions are shown merely diagrammatically, the actual mechanical arrangement being in accordance with the Reynolds and Baldwin patent heretofore referred to.

Disk $a$ of the switch is so cut as to open the conducting path between the coöperating conducting springs 16 and 17 when the switch is in position 1, and to close the path in all other positions of the switch. Disk $b$ is so cut as to connect the associated contact springs 22 and 23 in position 1 and to disconnect these springs from each other in all other positions of the switch. Disks $c$ and $d$ are each cut the same as disk $b$ and control their associated contact springs 24, 25, 26 and 27 in the same way. Disk $e$ is cut so that the associated spring 29 is connected with spring 28 in position 1 of the switch, and is connected with associated spring 30 intermittently during the rotation of the switch. This is done by providing disk $e$ with a series of projections 34 so arranged that the connection between springs 29 and 30 is closed for five degrees and open for ten degrees of arc alternately, beginning fifteen degrees after the center line for position 1 and ending ten degrees after the center line for position 18. Thus the series of projections arranged as shown is continued throughout the whole of the portion of disk *d* that is not illustrated.

The cutting of disk *f* of the switch is such that contact spring 32 is disconnected from the associated springs 31 and 33 in position 1 of the switch, but is connected with them alternately from position 1½ to position 18¼, inclusive. The projections 35 adapted to come into engagement with contact spring 31 are so arranged that spring 31 is connected with spring 32 for five degrees and disconnected for ten degrees alternately in the movement of the switch, beginning ten degrees after the center line for position 1 and ending five degrees after the center line for position 18. The projections 36 adapted to come into engagement with contact spring 33 are so arranged that spring 33 is connected with spring 32 for five degrees and disconnected for ten degrees alternately in the movement of the switch, beginning at the center line for position 2 and ending at the center line for position 18. The projections 35 and 36 are continued in the manner indicated throughout the whole of the portion of disk *f* that is not shown.

Referring now to the particular circuit organization in connection with which the invention in its present form is illustrated as being used, this is shown to consist of several telephone lines with finder switches F, F', for making connection therewith, and circuits and apparatus for controlling the same. As the subscribers' line circuits and apparatus and the line finder switches are only incidentally concerned with the organization of the invention, and serve merely to illustrate one of the uses to which the invention may be applied, it is unnecessary specifically to illustrate or describe them. When one of the lines calls, it operates its associated line relay 38 and closes a circuit that extends from battery through the winding of relay 37, contact spring 24, segment *c* of the sequence switch A (which is at this time resting in position 1), contact spring 25, conductor 19, and front contact and armature of line relay 38 of the calling line to ground. Relay 37, in operating, closes a circuit that extends from battery through the left-hand winding of relay 39, front contact and armature of relay 37, back contact and armature of relay 40, and normally closed contact 41 to ground. Relay 39, in operating, closes a circuit that extends from battery through the right-hand winding and right-hand front contact and armature of relay 39, winding of relay 40, and to ground by way of closed contact 41. In a branch from battery of the circuit just traced is included a magnet 42 which may serve to control the brushes of the finder switches F, F'; and the relay 40, in operating, closes in its front contact a circuit for the energization of whichever of the magnets 43, 44, may be connected with the conductor 47 at the time by the closed condition of one or another of the associated contacts 45 and 46, respectively. The contacts 45 and 46 may be operated in any suitable manner so that one of the associated magnets 43, 44, at a time is connected with the conductor 47. Whichever of the magnets 43 and 44 is energized may cause the movement of the associated finder switch brushes, under the control of the magnet 42, to connect with the terminals of the calling line. When the finder switch completes connection with the calling line, the cut-off relay 48 may be energized and disconnect line relay 38 in the usual manner. Line relay 38, in releasing, removes ground from conductor 19. After one or another of the finder switches F, F', has been started to connect with the calling line, but before the line has been connected with, contacts 41 are opened in any suitable manner to break the energizing circuits that they control. This permits the deënergization of the relays 39 and 40 and the finder switch magnet 42.

For a complete understanding of the circuit the operation of which has been described in outline above, reference may be had to Patent No. 1,247,770 to S. B. Williams, Jr., issued November 27, 1917. The switch 41 of the present application corresponds to the lower armature and contact of relay 23 of the above-mentioned Williams patent, the switches 45 and 46 of the application correspond to the sequence switch contacts 206 (2) of the patent, the relays 43 and 44 of the application correspond to the relays 30 of the patent, the magnets 60 and 61 of the application correspond to the line finder switch up-drive magnets 32 of the patent, and may be under the control of their associated relays 43 and 44 in the same way that the magnet 32 of the patent is under the control of the relay 30, and the magnet 42 of the application corresponds to the trip magnet 16 or 17 of the patent. The finder switches F and F' of the application correspond to the line finder switches LF and LF' of the patent and may control and be controlled by the associated circuits in the same way as in the patent.

In the foregoing, the operation has been described without particular reference to the functions performed by the sequence switch A. When the relay 39 operates, as described above, it closes a circuit that extends from battery through the winding of relay 54 and left-hand front contact and armature of relay 39 to ground. Relay 54, in operating, closes a circuit that extends through the motor magnet 21 of the sequence switch, contact spring 26, segment *d* (position 1), contact spring 27, and upper front contact and armature of relay 54 to ground. The sequence switch starts to rotate, and as it moves its conducting disks past position 1¼ it breaks the circuit just traced, by way of contact springs 26 and 27, breaks the circuit by way of contact springs 24 and 25 through which the line relays 38 have control over relay 37, and closes the circuit by way of contact springs 16 and 17. The closing of the last-mentioned circuit maintains the motor magnet 21 energized until the sequence switch has made one complete rotation and again moved its conducting disks back to position 1. During this period the conductor 19 is kept open, being closed only when the cycle of rotation is completed and springs 24 and 25 are again connected together through conducting portions of segment c in position 1. The object of this is to keep the conductor 19 open until after the started finder switch has found and deënergized the line relay 38 of the calling line to remove the ground from conductor 19; and to this end the rate of rotation of the sequence switch A is made such that the interval required for it to make one complete rotation is something greater than the maximum interval required by a finder switch to find a calling line and release its line relay.

As the conductor 19 that is opened by the sequence switch when it starts to rotate is the path over which the calling lines act to secure the services of finder switches, it is important that there be an instant indication if the finder switch fails to operate properly. To this end there is provided an alarm circuit including, in the present instance, a signal lamp 50 and a relay 49, together with three relays 51, 52 and 53 for controlling the same. These relays are so constructed that they are slow to attract their armatures and close their associated contacts after their energizing circuits are completed. This may be accomplished by providing the relay magnets with copper sleeves, adjusting the retractile tension on the armatures, or in any other well-known manner.

When relay 54 attracts its armatures upon the initiation of a call, as heretofore described, a circuit is completed from battery through the winding of relay 53, contact spring 29, segment e (the sequence switch A being in position 1), contact spring 28, outer lower contact and armature of relay 54 and to ground by a divided path, one branch of which passes through the inner lower armature and contact of relay 54 and the left-hand front contact and armature of the relay 39, and the other of which passes through contact spring 23, segment b and contact spring 22. As a result of the closure of this circuit, relay 53 starts to energize. But, as previously described, relay 54 at the same instant has completed in its upper contacts the circuit for energizing the motor magnet 21 of the sequence switch. Consequently, if the sequence switch is operating properly, it starts to move out of position 1 at the instant relay 53 starts to energize; and before relay 53 has time to attract its armature and close the associated contact, the movement of the sequence switch has caused the energizing circuit of relay 53 to be broken in the contacts 28 and 29 of segment e. If, however, the sequence switch A should fail to move or be delayed in its movement out of position 1 (as by the slipping of the driving mechanism), the energizing circuit of relay 53 would remain closed long enough to cause the attraction of the armature and the closure of the associated contact. In this case, a circuit would be completed from battery through the winding of relay 49, lamp 50, and front contact and armature of relay 53 to ground. As a result, the lamp 50 would light, notifying the attendant that the sequence switch was not operating properly; and the operation of the relay 49 would be employed to close a circuit for sounding an alarm or causing such other action as might be desirable under the circumstances. As long as the sequence switch remains in position 1 after relay 54 operates, a locking circuit is completed for relay 54 by way of its inner lower contact and armature, and to ground by way of contact springs 23 and 22 connected by way of segment b in position 1. Thus, if the sequence switch fails to move, the energizing circuit for relay 53 is maintained independent of the path to ground by way of the left-hand front contact and armature of relay 39, and the alarm devices continue active.

From the moment the sequence switch in its rotation reaches position 1½ until it passes out of position 18½ one or another of the slow acting relays 51, 52 and 53 has its energizing circuit closed. In position 1½ the energizing circuit of relay 52 closes. In position 1¾ the circuit of relay 52 opens and that of relay 53 closes. In position 2 the circuit of relay 53 opens and the circuit of relay 51 closes. In position 2¼ the circuit of relay 51 opens and the circuit of relay 52 closes. As the sequence switch rotates, the energizing circuit of the three relays 51, 52 and 53 are thus closed in order, intermittently and consecutively, until the switch moves past position 18½, at which point the circuit of relay 53 is opened, the switch coming to rest in position 1 a moment later with the energizing circuits of all three relays interrupted.

With the sequence switch rotating at its normal rate of speed, the intermittent closures of the energizing circuit of each of the relays 51, 52 and 53 are of insufficient duration to cause the energization of the relay and the closure of its associated contact. But if the sequence switch stops at any intermediate point, or slips sufficiently to maintain the closure of the energizing circuit for an undue length of time, the relay 51, 52 or 53 that is in circuit at this point is fully energized, attracts its armature, and completes the circuit of the alarm devices in the manner already described in connection with relay 53.

Although in the present instance three controlling relays, 51, 52 and 53, are illustrated as being employed in connection with the alarm circuit, it obviously is possible merely by making an appropriate modification in the cutting of the sequence switch disks to effect the result with two or more of such relays. In case it should be desirable to use a slower normal rate of rotation for the sequence switch, either a larger number of slow acting relays and sequence-switch-controlled energizing circuits for the same could be employed, or the present number of relays could be used by making them slower acting. With a quicker normal rate of rotation, the relays may be quicker acting or a smaller number may be employed.

It also is possible within the spirit of this invention to use slow releasing relays holding their armatures attracted to keep the alarm circuit open as long as the rate of rotation of the sequence switch is normal, but releasing one or another of the armatures to close the alarm circuit upon the slowing or stopping of the sequence switch at any intermediate point. Other obvious modifications of the alarm circuit controlling arrangement will readily suggest themselves to those skilled in the art.

What is claimed is:

1. The combination with a circuit controlling apparatus comprising a plurality of contact devices consecutively operable at a definite rate, of a timing device governed by each contact device, and an alarm signal controlled by the timing devices.

2. The combination with a sequence switch and means for moving the same, of a signal, a plurality of slow-acting relays controlling the same, separate energizing circuits for said relays, and switch contacts controlled by said sequence switch in its movement and controlling said energizing circuits, said switch contacts being adapted to open and close said energizing circuits intermittently and consecutively.

3. The combination with a circuit controlling commutator, of a plurality of sets of contacts closed and opened intermittently and consecutively as the commutator moves, a slow-acting relay for each set of contacts, an energizing circuit for said relay controlled by said contacts, and an alarm signal circuit controlled by said slow-acting relays.

4. The combination with a circuit controlling commutator, of a slow-acting alarm signal device, and controlling parts for said signal device associated with said commutator and intermittently operated in the movement thereof, the rate and duration of the operative intervals of said controlling parts in the normal movement of said commutator being such as to maintain said slow-acting signal device in an inoperative condition.

5. The combination with a circuit controlling device adapted to move from one to another of its operative positions at a predetermined rate of speed, of a slow-acting electromagnetic signaling device, and a controlling switch therefor associated with said circuit controlling device, said controlling switch being adapted to effect the operation of said slow-acting electromagnetic signaling device when the circuit controlling device stops between operative positions or moves at a speed less than the predetermined rate.

6. The combination with a sequence switch, of an alarm signal device therefor, a slow-acting magnet controlling the operation of said alarm signal device, and switch contacts associated with said sequence switch for controlling the energizing circuit of said slow-acting magnet, said switch contacts being adapted to alter the operative condition of said slow-acting magnet to operate the signal device when said sequence switch moves at less than a predetermined rate of speed.

7. The combination with a sequence switch, of an alarm signal therefor, a plurality of slow-acting magnets for controlling said alarm signal, an energizing circuit and a controlling switch for each of said magnets, said controlling switches being associated with said sequence switch and operated to open and close their respective energizing circuits intermittently in the movement of said sequence switch, the open circuit condition of one of said switches coinciding with the closed circuit condition of another of said switches.

In witness whereof, I hereunto subscribe my name this 3rd day of July A. D., 1916.

RALPH L. QUASS.